United States Patent [19]
Haas et al.

[11] Patent Number: 5,576,049
[45] Date of Patent: Nov. 19, 1996

[54] PROCESS OF MANUFACTURING ROTTABLE THIN-WALLED STARCH-BASED SHAPED ELEMENTS

[75] Inventors: Franz Haas, Vienna; Johann Haas, Klosterneuburg; Karl Tiefenbacher, Vienna, all of Austria

[73] Assignee: Franz Haas Waffelmaschinen Industriegesellschaft M.B.H., Vienna, Austria

[21] Appl. No.: 446,677

[22] PCT Filed: Dec. 6, 1993

[86] PCT No.: PCT/AT93/00185

§ 371 Date: May 31, 1995

§ 102(e) Date: May 31, 1995

[87] PCT Pub. No.: WO94/13734

PCT Pub. Date: Jun. 23, 1994

[30] Foreign Application Priority Data

Dec. 4, 1992 [AT] Austria ................................. 2402/92

[51] Int. Cl.⁶ ..................................................... B05D 3/02
[52] U.S. Cl. .................... 427/389.9; 427/394; 427/230
[58] Field of Search ...................... 427/394, 230, 427/384, 385.5, 389.9

[56] References Cited

U.S. PATENT DOCUMENTS 5,376,320  12/1994  Tiefenbacher et al. .................. 264/50

FOREIGN PATENT DOCUMENTS 0444880  9/1991  European Pat. Off. .
WO90/01043  7/1988  WIPO .

*Primary Examiner*—Janyce Bell
*Attorney, Agent, or Firm*—Collard & Roe, P.C.

[57] ABSTRACT

This invention relates to a process applying a water-repellent and/or waterproof coating to at least one side or the inside of shaped elements, which are obtained in that starch-containing compositions are baked between two mould halves or are extruded. That process is characterized in that a lacquer which in addition to one or more low-boiling solvents which are miscible with water and are innocuous from the aspect of human and/or ecotoxicology and one or more rottable film-forming substances and one or more rottable hydrophobic plasticizers is applied and during the application of said lacquer the adsorbed water of hydration is removed from the surface layer of the shaped element which is to be coated, whereafter the solvent mixture is removed which a minimum moisture content from 5% by weight to one at which there is no odour maintained in the substrate. Suitable film-forming substances include alkyl celluloses and non-hydrophobic water-insoluble cellulose esters of the group consisting of cellulose acetate butyrates, cellulose acetate propionates and cellulose acetates. Suitable plasticizers include hydrophobic triglycerides of fatty acids having medium and long chain lengths (chain lengths larger than or equal to C4), triglycerides partly substituted with substituents having shorter chain lengths, and, provided that at least one fatty acid having a chain length larger than or equal to C14 is contained, phthalic acid esters, acylic dicarboxylic acid esters, fully esterified citric acid esters, saccharose acetate isobutyrate and other hydrophobic sugar esters.

16 Claims, No Drawings

PROCESS OF MANUFACTURING ROTTABLE THIN-WALLED STARCH-BASED SHAPED ELEMENTS

It is an object of the present invention to provide shaped elements, such as cups, plates, boxes, generally containers of various types, as well as sheets, mats and films, which are rottable, on the one hand, and on the other hand are water-repellent to watertight at least in the regions in which they are contacted by the products to be received.

A large number of such products are presently made from no n-renewable raw materials by technologies which are likely to cause malfunctions and t heir use results in an increase of the volume of long-lasting solid waste materials. This gives rise to problems which relate to raw materials, environmental conditions and the disposal of waste materials so that it is necessary to pro vide alternative products which are more compatible ecologically. For instance, bulky and durable plastic packages are used with foodstuffs, particularly for immediate consumption. Whereas such plastic packages are relatively light in weight, they occupy a considerable volume in the garbage container and in the dump and may sometimes be carried away by the wind. If they are simply thrown away in case of their outdoor consumption, they will mar the environment often for years. In addition to said problems regarding disposal, the consumption of increasingly scarer fossil raw materials and the transportation and production risks are significant.

Various renewable raw materials may be used in principle to substitute fossil raw materials in the production of materials and the manufacture of-rottable products and most of them belong to the groups consisting of the carbohydrates, fats, and proteins. Whereas carbohydrates having a low molecular weight ("sugars"), fats and proteins are mainly used in foodstuffs, considerable production capacities for and resources of polysaccharides, such as cellulose and quickly renewable starch, are available for replacing of fossil raw materials.

As regards starch as a base material, a number of packaging products have been developed only in the last decades. Such shaped elements are made, e.g., in that they are baked between two mold halves or in that starch-containing compositions are extruded.

Shaped elements made by a baking of starch-containing compositions have been described in U.S. Pat. No. 5,376, 320.

In the process described there, a tough, strong product having a high stability is obtained in that 1) a baking composition is used which is substantially fatfree and has been prepared from the following ingredients:
   a) 30 to 63% by weight, preferably 42.0 to 58.0% by weight water;
   b) as a starch basis 27.0 to 69% by weight, preferably 36 to 56,5% by weight, particularly 44 to 49% by weight, of a starch or a mixture of different starches and/or a flour or flour mixture;
   c) as a release agent 0.04 to 11% by weight, preferably 0.2 to 4.5% by weight, of one or more fatty acids having medium or long chain lengths and being optionally substituted and/or their salts and/or of their acid derivatives, such as acid amides; said components may optionally be supplemented or replaced in part or, in individual cases, entirely replaced by 0.5 to 6.5% by weight, preferably 0.1 to 4.2% by weight, polymethylhydrogensiloxanes, and where both groups of compounds are us ed in conjunction with high concentrations of fatty acids the concentration of polymethylhydrogensiloxanes should not exceed 3% by weight, as a rule;
   d) 0 to 10% by weight, preferably 0.1 to 7.5% by weight, of a thickening agent, particularly 1.0 to 5.5% by weight dried gelatinized starch, pregelatinized starch or waste baked products, and/or 0 to 2% by weight, preferably 0 to 1.0% by weight, guar meal, pectin, carubine, carboxymethyl cellulose and/or 0 to 5.5% by weight, preferably 0 to 3% by weight, gum arabic;
   e) 0 to 16.0% by weight, preferably 0 to 11% by weight, high-cellulose raw material, in case of pulp up to 26,9% by weight and/or other plant fibers and/or fibers of plastic, glass, metal, carbon and others;
   f) 0 to 10% by weight, preferably 0 to 7.5% by weight, non-fibrous fillers, such as calcium carbonate, coal, talc, titanium dioxide, silica gel, alumina; 0 to 3% by weight, preferably 0 to 2.5% by weight, shellac; 0 to 2.0% by weight, preferably 0 to 1.0% by weight, soybean protein, wheat gluten powder, chicken protein powder, casein powder, caseinate powder;
   g) as a humectant 0 to 3.5% by weight, preferably 0 to 2.5% by weight, common salt and/or 0 to 2.5% by weight, preferably 0 to 1.5% by weight, glycerine, glycols and/or 0 to 4.5% by weight, preferably 0 to 3.5% by weight, sorbitol;
   h) as a coloring material 0 to 0% by weight, preferably 0 to 7.5% by weight, inorganic pigments and/or 0 to 0.1% by weight natural and synthetic dyestuffs and/or 0 to 2.5% by weight, preferably 0 to 1% by weight, sugar color and/or 0 to 1% by weight carbon blacks and/or 0 to 3.5% by weight, preferably 0 to 2.5% by weight, cocoa powder;
   i) as structure-consolidating agent a zirconium salt solution, preferably as an alkaline solution of ammonium zirconium carbonate, the amount of zirconium compounds expressed as $ZrO_2$ amounting to 0 to 0.1% by weight, preferably 0.01 to 0.05% by weight;
   k) 0 to 0.25% by weight, preferably 0 to 0.1% by weight, preservatives; and
   l) 0 to 0.5% by weight, preferably 0 to 0.1% by weight, antioxidants;

2) the baking composition filling the mold is baked at 145° to 230° C. for 25 to 230 seconds; and 3) the resulting product is conditioned to contain 6 to 22% by weight moisture.

It has been found in the meantime that product may be modified in two respects:

1) In addition to or instead of starch it is possible to use at least one modified starch selected from the group consisting of starch esterified with organic acids or with phosphoric acid, etherified starch, cross-linked starch and starch which is modifiable by ionic interaction. That measure will distinctly improve the strength of the shaped elements.

The esterified starch may consist of a strach which has been esterified with acetic acid, succinic acid, alkenyl-substituted succinic acid or phosphoric acid.

A hydroxyethyl starch or a hydroxypropyl starch is used as an etherified starch.

A starch cross-linked with phosphate or dicarboxylic acid or glycerol is used as a cross-linked starch.

To effect an ionic interaction, aluminum sulfate, alkali silicate, dicalcium phosphate or calcium silicate is added to the starch.

2) Alternatively the proportion of the relatively expensive starch may distinctly be decreased.

The co-use of hydrophilic solids, such as cellulose and the like, was previously limited by the fact that they bind a multiple amount (5 to 10 times) of water, the evaporation of which will disturb the structure-forming process. On the other hand, the structure-strengthening effects of the fibrous materials are desirable. That water requirement can be decreased to some extent by the use of pre-used fibers or hydrophobized fibers (chemically modified cellulose, natural fibers, such as short flax fibers).

It has surprisingly been found that it is possible to use hydrophilic vegetable fibers, such as cellulose, hemicellulose, potato fibers, beet chips, and the like in larger proportions and even to use more fibers than starch if the pulverulent fibers are premixed in a dry state with the release agent—only pulverulent release agents may be used that case.

In that case the amount of the release agent should be at least 5% by weight and up to 26% by weight and preferably 10 to 20% by weight of the cellulose content.

If the baking composition is prepared in the same manner in other respects from 1. water
2. fillers, starch, premixed with thickening agent,
3. a mixture of fibrous material and release agent this procedure will result in two significant differences:
    1. The water required for the solids is decreased and is less than 4 times the weight of the fibrous material;
    2. The contact angle of the baking composition as it is charged into the baking molds is increased.

Both results are required for and indicate a uniform structuring because the amounts of water are not excessive and evaporate uniformly but not prematurely.

All said shaped elements have a porous structure and have a surface which although it contains micropores is visually substantially closed and is predominantly characterized by the presence of starch which is amorphous and has been thermally denatured so that it is no longer present in its granular or partly crystalline native form, and optionally by the presence of cellulose fibers.

Said shaped elements may also be formed by an extrusion of starch-containing compositions. Such shaped elements are made in a mixing and kneading extruder by the processing of a thermoplastic composition, which consists of starch, starch derivatives or high-starch compositions containing also plasticizing substances, such as water, glycerol, and other polyols, and various minor additives. The principles of said manufacture have been explained, e.g., in Application WO 9005161, in EP-A1 118240, in Applications WO 9102024 and WO 9102025, and in U.S. Pat. No. 5,095,054. Said publications describe such materials which have been produced from starch, which has initially been rendered thermoplastic, and said materials in addition to an amount of starch (derivatives) in different concentrations contain in most cases also other natural and synthetic substances.

The resulting high-starch thermoplastic compositions are processed to form shaped elements directly or after an intermediate product has been made, which in most cases is granular. This is effected by known methods of processing thermoplastic materials, such as foaming, injection molding, blow molding, extrusion of films.

Said shaped elements have a surface which is visually substantially closed and which is characterized in that it mainly consists of amorphous starch which has been thermally denatured so that it is no longer present in its granular and partly crystalline native form.

WO 90/01043 proposes to coat such hydrophilic surfaces in that a coating is applied which consists of an aliphatic polyester, e.g. a polyhydroxycarboxylic acid, which is dissolved in chloroform and/or trichlorobenzene and by one of the conventional physical or chemical coating methods is applied to the shaped elements consisting, e.g., of starch. When the solvent has volatilized, a coating film is left on the surface. If the layer formed by the coating has a sufficient thickness, the water can no longer dissolve or cause to swell the surface of the starch which has thus been treated. Such combinations of layers stick only poorly to each other. The adhesion is improved by various measures, e.g. by a preceding corona treatment of the starch surface and/or by an addition of a solvent or swelling agent for the starch, such as dimethyl sulfoxide, to the coating solution.

Starch is a polymer which is composed of alphaglucose units and for this reason is highly hydrophilic. Amyloselike linear and particularly relatively short molecule chains are water-soluble: other structures, inclusive of branched structures (amylopectin) can form colloidal dispersions in water. Native starch has a granular, partly crystalline, non-fibrous overall structure, which in the presence of water and optionally of plasticizers and as a result of a mechanical and/or thermal action, e.g., in an extruder or in a baking mold, will be subjected to thorough swelling, loosening, decomposing, and solubilizing effects (e.g., to a formation of paste or plastification). This is particularly different from the use of cellulose, which is composed of beta-glucose units and is water-insoluble and fibrous and has a much higher overall structural stability.

Processed starch which has been thermally treated and possibly mechanically treated (under pressure, by shear forces) will form products which are amorphous and often loose, porous and, in the presence of plasticizing components are brittle, fragile and no longer re-shapable and have a low load-carrying capacity.

An access of moisture will quickly change the mechanical properties so that the product becomes softer and expands and even without a direct contact with water will loose its strength and shape in humid air at water activities distinctly below 1.

In the manufacture of foamlike porous shaped elements a first manufacturing step which is analogous to the known manufacture of edible wafers comprises the baking of materials between two mold halves. A composition prepared from starch, water, and adjuvants is charged into the baking molds. Physical-chemical processes taking place include swelling, dehydration, a gelatinization of the starch, a formation of a foamed porous three-dimensional structure by a development of water vapor under an increased pressure and a strengthening of that structure by a supply of energy and an escape of water. The removal from the mold is followed by a gradual cooling, which is succeeded by an adjustment to a relative moisture content above 50%, which is intended to provide in the product a water content in excess of 6% but not in excess of 22%. The content of starch solids is between 40 and 88%.

In the manufacture of non-porous shaped elements, materials are compounded in the first manufacturing step from starch, high-starch flours of various kinds and/or starch derivatives as well as adjuvants, preferably in an extruder. The respective contents of starch and starch derivatives should exceed 40% of the solids content.

The concentration and identity of the adjuvants may vary. But they can functionally be associated with the following classes of substances. With the exception of those mentioned first, their addition is optional.

Plasticizers, such as water from the natural water content of the starch or as an additive, consisting, e.g., of glycerol or other polyols, in a total amount of at least 5% and not in excess of 40%;

lubricants, such as fats, fatty acids, fatty acid derivatives, emulsifying agents;

binders, such as various synthetic polymers, e.g., polyolefins, polyvinyl alcohols, polyacrylates;

fillers and additives for adjusting the hardness and color and for cost reduction.

During the extruding the starch is transformed to a plastic state in that the partly crystalline granular structure is destroyed and a plastically flowable mixture is formed. This is effected in the first place by the shear forces in tile kneading and transporting zones of the extruder and in the second place by the simultaneous heating by mechanical and thermal energies supplied. If suitable means are provided, the material might subsequently be directly processed to form shaped elements (by injection molding, blow molds, extrusion of films) from that plastic molten material. But in most cases the material will be discharged from the extruder as a strand and after a gradual cooling will be divided into fine granules. Said granules are shaped in plastic-processing machines to form the final products. After that shaping step, high-strength substrates may be subjected to an equalization of their moisture content to exert a considerable influence on their mechanical strength:

Relative moisture content below 50%, preferably below 40%: Hard, brittle, particularly if the plasticizer content is decreased below 12% by a loss of water.

Relative moisture content above 50%, particularly above 65%: Soft, elastic, particularly if the plasticizer content is increased above 22% by an absorption of water.

It is an object of the invention to coat the above-mentioned starch surfaces at least in part, e.g., on their upper side or inside, in such a manner that they will be durably watertight for the usual times of use at refrigeration temperature, room temperature, and partly also at high temperatures above 37° C.

A typical example for the application of such coated shaped elements are containers for receiving foodstuffs and luxury foods. Another typical application is the improvement of the resistance of water-susceptible starch surfaces to an occasional action of liquid, such as splash water or rain, which would otherwise result in an irreversible destruction of said surfaces by swelling, deformation, tearing etc., or the improvement of the stability under a temporary action of a relatively high humidity, which in the case of foamed materials might result in a softening and a collapsing of the structure if the relative humidity is in the range from about 85 to 100%. In that case the modulus of elasticity in tension of products processed on extruder machines will be reduced.

The uncoated starch-based shaped elements which have been described hereinbefore cannot be used to hold water-containing foodstuffs, fat-releasing foodstuffs, and foodstuffs which are susceptible to air.

In connection with packaging materials made of paper that problem has been solved by the provision of a coating of plastic material. But this will give rise to problems regarding the disposal of waste material.

For use with foodstuffs, packages made of edible material are available, such as wafer cups for ice cream. But such wafer cups can be used to hold ice cream or frozen foodstuffs only for a short time. As has been described in Published German Patent Application 3,543,090 such wafer cups are provided, as a rule, on the inside with a coating of coconut fat or other high-fat edible substances. A fat layer for wafers is mentioned also in Austrian Patent Specification 363, 304. A fat coating for repelling water in cornets for ice cream is described also in U.S. Pat. No. 3,526,515.

In EP-A2 0,045,522 it has been proposed, inter alia to provide fat coatings. British Patent Specification 947,672 describes oil coatings which contain a desiccant. U.S. Pat. No. 4,390,553 describes mixtures of fat and emulsifying agents and their application. Besides, EP 0,271,853 describes the application of two fat frostings to wafer cups.

But such impregnation with fat will provide only a limited protection. Attempts to apply more oil or molten fat to said finely porous substrates will result in an undesired permeation through the wafer. When the fat has solidified said fat coatings owing to their brittleness often form cracks under a mechanical stress, the occurrence of crystal transformations (formation of needles of frozen fat,) or simply as the result of a thermal shrinkage and separation during the required cooling. For a temporary storage, e.g., of ice cream (cornets for frozen ice cream), this practice will nevertheless afford advantages because the permeation of moisture—calculated for the entire cornet—is distinctly reduced so that the softening of the wafer is delayed. But aqueous liquid contents will permeate within a few minutes owing to the above-mentioned cracks and defects in the cornet and fat layer.

This invention relates to the provision of a reliably watertight coating on substantially closed and possibly microporous surfaces which are mainly constituted by thermally denatured starch. This does not preclude a use with other products which have a lower starch content or with high protein surfaces or with other hydrated surfaces.

For explanation the terms which are used will subsequently be defined, the substrate will be described, and the proposals for a solution which can be derived from the prior art and the results thus produced will subsequently be set forth.

In general usage and sometimes also in the technical and patent literature some terms which have different meanings are often used as synonyms. This is true, e.g., for the terms "water-insoluble" and "watertight". But it must be borne in mind that the combination of a water-insoluble material with a second material consisting, e.g., of a coating will not necessarily cause the entire composite to be waterproof. A priori, substances which are water-insoluble (waterproof) do not in themselves or if applied in a specific manner (e.g., as a coating) constitute a barrier preventing a permeation or diffusion of water.

The requirements to be met by the coatings provided in accordance with the invention on starch-based material will be described hereinafter by a few examples.

In the sale of, e.g., fruit, vegetables or mushrooms, trays of foamed plastics or of plastic-coated cardboard are often employed. Said contents continuously release moisture to the environment at a hardly perceivable rate. Water may condense in corresponding outer packages.

To permit the use of starch-based trays for said purpose, a closed coating must be applied to at least one side and must be able to prevent for 24 hours a permeation of water or must reduce such permeation to such an extent that the shape and function of the tray will not be changed during that time.

Another example is constituted by containers for fast food. Foodstuffs which are charged into the containers in a hot and steaming state (e.g., French fried potatoes, minced meat etc.) will release more water vapor and water.

A closed coating applied to at least one side must resist that action of moisture and temperature and must be effective for at least 2 hours even when the contents has been cooled.

The maximum requirement is for layers which will resist hot liquids, such as coffee.

Another example is constituted by meat trays for the distribution of fresh meat at a refrigeration temperature and sometimes also at the ambient temperature.

A large number of formulations, mainly based on plastics, are known for making waterproof coatings on shaped substrates. Said formulations are applied by spraying or dipping as a solvent-containing lacquer or as an aqueous dispersion or as a molten material.

Such coatings are applied to perform at least one function and in most cases a plurality of functions, such as:

repelling water;

forming a water diffusion barrier to prevent a drying or moistening;

forming a diffusion barrier for oxygen or other gases:

forming a diffusion barrier for oil, fats, aromas, etc.:

improving the mechanical, visual and hygienic properties of the product (protection);

serving as a carrier for preservatives, dyestuffs, flavors, and other foodstuff additives.

Typical uses of such coatings will be found in the distribution of feedstuffs, e.g., in the coating of fruit and vegetables with thin wax layers to reduce the loss of water and improve the protection against microorganisms without inhibiting the respiration of the cells.

Besides, a number of coatings which are edible in principle are known; see the review by J. J. Kester and O. R. Fennema, Food Technology 40 (12), 1986, in which polysaccharides, proteins or lipids are disclosed as film-forming substances. But they are not sufficient as moisture barriers for the present objective. This is also true of so-called "two-layer" films, in which a film-forming matrix consisting of water-soluble cellulose esters, such as hydroxyethyl cellulose, hydroxypropyl cellulose or methyl cellulose, contains polar and in most cases long-chain lipids, such as fatty acids, fatty alcohols, an d which constitute a barrier consisting of a double layer.

It was obvious to consider the application of layers or frostings of fat known from the above-described technology for wafers for ice cream as well as coating compositions and technologies known from papermaking (see Ullmann, IV. Vol. 17, 623 et seq.).

A number of proposals are also known from the patent literature.

U.S. Pat. No. 4,661,359 describes the manufacture of such double-layer films in that water-soluble celluose ethers are thermally cross-linked with shellac with the aid of an acid catalyst and various fatty acids are added.

EP-A3 0,090,559 describes coatings comprising shellac, zein, and cellulose derivatives.

Published German Application 2,556,254 also uses films of zein and alginates.

EP-A3 0,045,522 describes the above-mentioned fats as well as proposals involving the use of sugar sirup as well as hydrocolloids.

According to U.S. Pat. No. 4,293,572 fats, emulsifying agents, and sugar sirup are combined to form dispersions or emulsions for coatings on foodstuffs.

U.S. Pat. No. 3,471,304 teaches the use of combinations of cellulose ethers with emulsifying agents having different polarities.

U.S. Pat. No. 1,960,266 describes coatings provided on paper and comprising paraffin, wax, synthetic resin, and plasticizer.

Finally, German Patent Publication 1,043,049 discloses "waterproof" coatings provided on fruit by the application of a resin-shellac-glycerol mixture.

It is generally noted that a coating of "water-insoluble material" does not mean that the coating is watertight. Whether the layer is closed, its permeability coefficients and the swellability must also be taken into account.

The use of ethyl cellulose as a film-forming substance has been known for a long time and its properties and uses have been compiled, e.g., in Technical Information CSL-2284, Hercules, 1983. Clear solutions are formed with solvents which consist mainly or entirely of aromatic compounds or chlorinated hydrocarbons.

The use of water-miscible polar solvents, such as alcohol, acetone, results in fragile films. Strong, flexible films can be formed with use of such solvents only in the absence of water. The modification of the properties of the film by resins, also as regards the resistance to water, and the use of various plasticizers, are also described there. Recommended formulations containing toluene/ethanol 8/2 as solvents are stated. The recommended solvents, such as aromatic compounds and chlorinated hydrocarbons, cannot be used owing to the sorption properties of starch (residue problems) and this will also be true in case of an enforced thermal desorption, which by the simultaneous desorption of water will destroy the integrity of the material. Whereas such solvents can be used for strictly technical purposes, they are presently undesired owing to problems of ecology and workplace hygiene.

All proposals which are known from the patent terature and technical literature and are directed to the provision of coatings which are water-repellent, washable or waterproof attempt to achieve this along two basic routes:

1. Layers which are based on oils and fats and are applied to form one or more layers containing also other components, which are often hydrophilic, are, owing to the typical properties of said fatty substances:

only slightly cohesive, often fragile, particularly if they contain hydrogenated fats; easily meltable, particularly if they contain fats which are not hydrogenated or only partly hydrogenated; unstable against crystal transformation in storage even in the absence of extreme temperature changes.

2. Layers consisting of water-soluble or water-insoluble film-forming substances and contain also modifiers. Such modifiers may consist of vairous natural substances, such as proteins, resins, emulsifying agents, and various synthetic and natural plasticizers. They are applied from solutions, which in the presence of polar components contain water of water-miscible solvents, such as alcohols or lower ketones. In the case of water-insoluble film-forming substances, non-polar solvents, such as aliphatic, aromatic or chlorinated hydrocarbons are used and the layers are applied in the absence of water.

It is particularly difficult to provide a durably hot water-resistant coating on soft, porous shaped elements, which in dependence on their water content are not dimensionally stable. Such products mainly made from hydrophilic polar substances, such as starch, other polysaccharides, proteins, are obviously not stable in contact with water or water-containing substances and will swell, deform, or dissolve. The sorption isotherm of such materials exhibits the known increase and decrease of the water content in dependence on an increase and decrease of the relative humidity. Such changes of the water content in dependence on the ambient conditions are accompanied by a dimensional change, which may amount to several percent and which must be tolerated by an applied layer without causing a separation, a formation of cracks or another failure.

In all attempts to use the above-defined starch-containing substances for a reliable, waterproof and dense sealing it has not been possible thus far to use the known processes known for wafers or for cellulose-based substances for an application of non-polymeric layers for an effective protection against water (see the examples which are not carried out in accordance with the invention).

Because the typical cellulose-containing substances (a) have a fibrous structure, (b) are compact and (c) can easily be consolidated they can very easily be used to form sufficiently stable units (such as sheets, layers, shaped elements etc.) by an addition of glue and binders without an addition or presence of specific plasticizers, which units are smooth and have a sufficient stability against mechanical and thermal influences and other environmental influences (e.g., the humidity and the action of solvent), and such units can subsequently easily be coated with known agents. But highstarch surfaces will give rise to much higher requirements, which call for a faultless elastic covering of the entire surface to prevent an access of water.

Even a locally restricted dissolution or swelling will result in deformations and dimensional growths, followed by a flaking of the protective layer, and on foamed porous products also in a softening and collapsing of the structure.

If a protective layer is provided, e.g., only on one side those portions of the high-starch substrate which are not covered will assume an equilibrium with the ambient moisture, which will result in a decrease of dimensions (dry air) or an increase of dimensions (humid air), which under circumstances may amount to several percent. The protective layer must conform to such requirements without a formation of cracks or creases and without flaking.

The deforming forces (upsetting, tension, buckling, particularly in thin-walled products) occurring in use must not cause the layer to open. This will regularly be the case particularly with coatings of oil or fat because they are only slightly cohesive. This is also true for most waxes, which often exhibit also defects caused by cracks, fractures and separation. Fats will give rise to a further problem consisting of crystal transformations.

All coating materials consisting of aqueous dispersions or solutions cannot be used because starch surfaces are particularly highly susceptible to water.

In general, it is basically difficult to apply a highly hydrophobic covering layer to a hydrophilic surface, which itself contains firmly adsorbed water molecules, and to anchor such covering layer on said surface, particularly because amphiphilic emulsifying agents which could effect such an adhesion also involve a stronger diffusion of water. Corresponding examples have been stated in the Sect ion concerning coatings which do not embody the invention as well as the testing of such coatings.

After numerous experiments it has been found that a durably safe protection of the starch surface can be achieved only by a sealing or a covering with prefabricated films, e.g., of various plastics. In view of the ecological considerations stated hereinbefore and the requirements stated, such a method must be rejected and it is desired to provide a covering which consists as far as possible of natural substances and/or derivatives of natural substances.

For a use of different materials in a combination which is reliable in use, e.g. in a combination comprising a hydrophobic covering layer on a hydrophilic substrate, a person skilled in the art will endeavor to incorporate a bonding or adhesive layer as is used, e.g., in fibrous composites for deeply drawn packages or packaging bags made from tubular films.

Polypropylene or polyethylene as a non-polar structural layer and polyamide/ethylvinyl alcohol as a polar barrier layer and an interposed bonding layer.

This may be compared to the use of wash primers with paints on surfaces.

A second variant is the use of emulsifying agents which have medium or relatively high HLB values and result in an interaction owing to their orientation and the interaction between the non-polar portion and the non-polar surface and between the polar portion and the polar surface. But they will promote also the permeation of liquid and for this reason are not suitable for the coating in accordance with the invention.

It has surprisingly been found that if the water of hydration adsorbed on the starch surface is removed at least in part it will be possible to effect a strong anchoring and interaction between even strongly hydrophobic covering layers and the described starch surfaces without a need for hydrophilic emulsifying agents and other bonding substances. In that case such covering layers cannot be removed without a destruction of the surface and a film which can be peeled off is not formed.

The process in accordance with the invention of applying a water-repellent and/or waterproof coating to at least one side or the inside of shaped elements, which are obtained in that starch-containing compositions are baked between two mould halves or are extruded, resides in that a lacquer which in addition to one or more low-boiling solvents which are miscible with water and are innocuous from the aspect of human and/or ecotoxicology and one or more rottable film-forming substances and one or more rottable hydrophobic plasticizers is applied during the application of said lacquer and the adsorbed water of hydration is removed from the surface layer of the shaped element which is to be coated, whereafter the solvent mixture is removed which a minimum moisture content from 5% by weight to one at which there is no odour is maintained in the substrate.

The solvents may consist of solvents which are low-boiling, i.e., which boil below 100° C., preferably below 80° C., and are selected from the group consisting of the alcohols, ketones or esters, with the exception of solvents which like methanol have pronounced humane- or ecotoxical properties. For this reason most other low-boiling solvents, such as aromatic compounds, halogenated solvents, nitriles, cannot be used.

The layers have thicknesses between 0.15 and 1.5 $g/dm^2$, preferably between 0.4 and 1.5 $g/dm^2$; this corresponds to an average thickness of about 15 to 150 micrometers of the layer.

From electron micrographs of cross-sections it is apparent that the region in which a direct interaction takes place in the substrate has a thickness of only a few tens of a micrometer and some pores are filled or bridged in that region and a particularly intimate bond is formed there. A particularly effective desorption of water by the solvent must be expected in that region. If a layer having (after drying) a thickness of about 20 to 40 micrometers it will be found that there is in the non-porous substrates an interaction in a zone having the same order of magnitude whereas in the porous substrates a certain interaction also caused by the solvent is assumed to take place in a second region having a further thickness of 100 to 300 micrometers.

Said effects can be concluded from the fact that the treatment of the products mentioned in Examples 1 et seq. with the solvent (mixture) alone results in a significant embrittling of the structure although the products do not contain components (other than water) which are soluble in the organic solvent. With solvents which contain substances which are entirely or partly miscible with water (e.g., acetone, ethanol, ethyl acetate) that embrittling is distinctly stronger than with solvents which will form only azeotropes with water.

If the organic solvent (mixture) is used also as a solvent for the hydrophobic components required in the coating, the surface will effectively be improved when the solvent has been evaporated:

a) Mechanical consolidation of the overall structure of the starch surface, also to substitute any inherent strength, e.g., of a cellulose structure, by an inclusion of substances and a physical-chemical interaction.

b) A reliable covering of all starch units throughout the surface even in an inherently micro-and/or macroporous structure. For that purpose an excessive flow of the lacquer must be prevented in that the viscosity is increased by means of film-forming substances.

Requirements to be met by the components to be applied and the resulting covering layers:

1. They must be strongly hydrophobic and water-insoluble. They must not in themselves be dispersible and/or emulsifiable in water. That basic principle is an explanation of the different suitabilities of certain substances, e.g., individual resins, resin derivatives, waxes, which in dependence on their origin and treatment may contain components which are too strongly hydrophilic or emulsifying.

If, as is usual as a rule, the strongly hydrophobic main component is used together with other substances, which are required to modify properties of the layer, such as its elasticity, gloss, tackiness, flow behavior, film-forming properties, color, said other substances must also be hydrophobic and water-insoluble.

2. The covering layers in accordance with the invention must firmly be anchored to the mostly pre-formed substrate surface without the aid of additional binders and must not be separable even by external influences, such as length changes caused by a hydration of the substrate or, vice versa, a shrinkage. In that case defects (pores, cracks) in the substrate are surprisingly bridged and the layer will be free of pores and cracks.

3. The resulting covering layers must be elastic and cohesive and under the typical stresses involved in their use (temperature fluctuations, mechanical pressure, tension) most not be deprived of their function, such as may easily be the case with known layers consisting, e.g., of edible fats, chocolate, sirups, as a result of a flowing or breaking owing to an insufficient cohesion, an internal crystal transformation, etc.

The following components are used in said covering layers:

Film-forming substances

Film-forming substances selected from the group consisting of the alkyl celluloses with the exception of products which are hydrophilic and partly or entirely water-soluble, such as methyl cellulose or hydroxyalkyl celluloses; also hydrophobic water-insoluble cellulose esters selected from the group consisting of the cellulose acetobutyrates, cellulose acetopropronates, cellulose acetates, but not their partly hydrophilic and partly esterified forms.

Specifically the above-mentioned viscosity increase, the bridging of pores and the elasticity of the layers will be effected by said film-forming substances and the couse of additional hydrophobic plasticizers is essential.

Plasticizers

Hydrophobic plasticizers selected from the group consisting of the triglycerides or fatty acids having medium and long chain lengths (chain length larger than/equal to C4), triglycerides partly substituted by substituents having shorter chain lengths, provide d that there is at least one fatty acid having a chain length larger than or equal to C14, phthalic acid esters, acyclic dicarboxylic acid esters, fully esterified citric acid esters, saccharose acetate isobutyrate (Eastman Kodak) and other hydrophobic sugar esters.

Binders

The binders consist of bydrophobic natural resins selected from the group consisting of rosin, copal, mastix, gum sandarac, shellac, hydrogenated di- and polymerized resins based on rosin, aliphatic hydrocarbon resins. On the other hand, partly hydrophilic or more strongly emulsifying substances, such as resin soaps, which are used to glue paper, are not suitable.

The use of a binder is not essential in an inferior embodiment but is preferred because it will result in an additional increase of the mechanical stability of the coating (Example 8). Formulations containing only plasticizers and binders are also regarded as inferior embodiments which are less effective as a permeation barrier (Example 9).

A series of compositions are stated in the lustrative embodiments. The ratio of the components of the coating to the solvent (mixture) is variable because the stated coating weights can be achieved by a multiple application and by a single application. The solvent content is, as a rule, between 65 and 95 liters and preferably between 70 and 92 liters and the corresponding amount of the components of the layer is 35 to 5 kg and preferably 30 to 8 kg. Said amounts must be chosen by the user in view of his or her technical knowledge.

If the stated film-forming substances are used, the stated layers will be waterproof at temperatures up to at least 60° C.

Test methods, evaluation

For the reasons stated, namely, 1. shaped substrates having a partly porous structure;
2. specific interaction and permeation of the coating through outer portions of the substrate, coatings can be tested for practical purposes only in complete substrate-layer combinations rather than as coating films on inert surfaces or as films of the coating material. The latter may possibly be used for an evaluation of the brittleness of a layer or the compatibility of the components.

Because the problem is difficult for the reasons. stated, the formation of a layer which is waterproof at least for times of a few hours is already an important progress. For this reason the kinetics of a possible permeation of water through the coating are significant too.

A diffusion which is reduced to such a degree that the coated test specimen is permeated within a test time of several hours by less moisture than the high-strength substrate can take up without being deprived of the required properties can already be regarded as a successful coating in accordance with the invention (test stage 1). But test times in excess of 24 hours must particularly be regarded as a criterion (test stage 2). In several examples the test time is directly stated in days in order to indicate the influence of certain components.

In view of these facts the thickness in which the coating is applied has a decisive influence too because it will proportionally decrease the rate at which water diffuses through the layer. For this reason, examples of coatings which are not in accordance with the invention are preferably formed to restrict the diffusion because the layers have particularly large thicknesses, e.g., in excess of 1.5 g/dm² but contain also only partly hydrophobic or emulsifying substances.

Resistance to hot water

A more severe test requirement is the resistance of the improved surfaces to hot water.

Test stage 3: Filling of an internally coated container with hot water at 60° C.

The container must hold for at least 60 minutes the liquid which has been charged in a hot state and is then allowed to cool at room temperature. This is intended to simulate the suitability of a drinking cup for hot beverages.

Illustrative embodiments:

The following substrates for the coating have a water content between 6 and 22%, preferably between 10 and 16%.

It is not possible to state the quantity of the solvent which is removed by the described dehydration, by a drying during the coating operation, or by the subsequent drying step. In certain cases, particularly when unmoistened warm air is used, losses up to 40% must be expected.

The coating is applied in the following sequence:

(a) Baking and drying the raw composition—adjustment of water content—application of coating;

(b) pre-drying and shaping (e.g., by injection molding) the granules—adjustment of water content—application of coating.

In another preferred embodiment, a unilateral lacquer layer is applied during the production of the base material in the following sequence:

(a) Baking and drying of the raw composition—application of the coating—adjustment of the equilibrium;

(b) pre-drying and shaping (e.g., by injection molding) the granules—application of the coating—adjustment of the equilibrium.

In that case the water content of the substrates made according to (a) will be in any case lower than 6% and preferably less than 4%. The adjustment of the moisture equilibrium in conjunction with a possible expansion of the shaped element will not result in a separation of the layer.

But substrates made according to process (b) may contain more water up to 22% after the manufacturing operation.

A: Cup, conical shape, 30 mm high

Diameter at the bottom 40 mm, diameter at the top 70 mm. Wide longitudinal ribs on outside surface, smooth inside surface with a small step at the transition from the side wall to the bottom. Inside surface 76 cm². White cup mainly of potato starch, density of material 0.18 g/cm³.

| Composition: | |
| --- | --- |
| Carbohydrates | 85.5% |
| Water | 10.5% |
| Protein less than | 0.5% |
| Fat less than | 0.5% |
| Other components | 3.5% |

B: Cup, conical shape, 30 mm high

Diameter at the bottom 40 mm, diameter at the top 70 mm. Wide longitudinal ribs on outside surface, smooth inside surface with a small step at the transition from the side wall to the bottom. Inside surface 76 cm². White cup mainly of potato starch, density of material 0.23 g/cm³.

| Composition: | |
| --- | --- |
| Carbohydrates | 85.0% |
| Water | 10.5% |
| Protein less than | 0.5% |
| Fat less than | 0.5% |
| Other components | 4.0% |

C: Cup, conical shape, 30 mm high

Diameter at the bottom 40 mm, diameter at the top 70 mm. Wide longitudinal ribs on outside surface, smooth inside surface with a small step at the transition from the side wall to the bottom. Inside surface 76 cm². White cup mainly of potato starch, density of material 0.19 g/cm³.

| Composition: | |
| --- | --- |
| Carbohydrates | 86.0% |
| Water | 9.5% |
| Protein less than | 0.5% |
| Fat less than | 0.5% |
| Other components | 4.0% |

D: Cup, conical shape, 50 mm high

Diameter at the bottom 50 mm, diameter at the top 65 mm. Outside surface smooth with a nesting ring, inside surface smooth with a rounded transition between the side wall and the bottom. Inside surface 100 cm². Beige-colored cup mainly of potato starch; density of material 0.21 g/cm³.

| Composition: | |
| --- | --- |
| Carbohydrates | 84.0% |
| Water | 10.5% |
| Protein | 2.5% |
| Fat less than | 0.5% |
| Other components | 3.0% |

E: Cup, conical shape, 50 mm high

Diameter at the bottom 50 mm, diameter at the top 65 mm. Outside surface smooth with a nesting ring, inside surface smooth with a rounded transition between the side wall and the bottom. Inner surface 100 cm². White cup mainly of potato starch, density of material 0.23 g/cm³.

| Composition: | |
| --- | --- |
| Carbohydrates | 85.0% |
| Water | 10.5% |
| Protein less than | 0.5% |
| Fat less than | 0.5% |
| Other components | 4.0% |

F: Sheets, smooth, thickness 2.1 mm, size 230 mm×290 mm White color, mainly of potato strach, density of material 0.16 g/cm³.

| Composition: | |
| --- | --- |
| Carbohydrates | 83.0% |
| Water | 11.0% |
| Protein less than | 0.5% |
| Fat | 0.5% |
| Other components | 5.5% |

G: Trays, 140 mm×210 mm, with rounded corners, and a 19 mm high rim provided with wide peripheral annular ribs. Color white, mainly of potato starch, density of material 0.18 g/cm³.

| Composition: | |
|---|---|
| Carbohydrates | 85.5% |
| Water | 11.0% |
| Protein less than | 0.5% |
| Fat less than | 0.5% |
| Other components | 3.0% |

H: Trays, 190 mm×140 mm, with rounded corners, and a 20 mm high rim, smooth, inside surface provided with a waferlike pattern and an emblem. Color grayish brown, mainly of potato starch, density of material 0.25 g/cm³.

| Composition: | |
|---|---|
| Carbohydrates | 75.0% |
| Water | 11.5% |
| Protein | 1.0% |
| Fat less than | 0.5% |
| Other components | 12.0% |

I: Trays, 135 mm×180 mm, with rounded corners and with a 15 mm high rim pattern with script, edges (on narrow side) with open pores. Pore size up to 1.5 mm. Color white, mainly of potato starch, density of material 0.21 g/cm³.

| Composition: | |
|---|---|
| Carbohydrates | 85.0% |
| Water | 11.0% |
| Protein less than | 0.5% |
| Fat less than | 0.5% |
| Other components | 3.5% |

J: Round plate, 130 mm in diameter, 23 mm high, smooth surfaces on all sides. Color white, mainly of potato starch, density of material 1.33 g/cm³

| Composition: | |
|---|---|
| Carbohydrates | 86.0% |
| including glycerol | 16.0% |
| Water | 8.0% |
| Protein less than | 1.0% |
| Fat less than | 0.5% |
| Other components | 4.5% |

K: Rod for tensile test in accordance with DIN 53455, Test Specimen 3, smooth surfaces on all aides. Color white, mainly of potato starch/corn starch, density of material 1.33 g/cm³.

| Composition: | |
|---|---|
| Carbohydrates | 82.0% |
| including glycerol | 19.5% |
| Water | 9.5% |
| Protein less than | 0.5% |
| Fat less than | 0.5% |
| Other components | 8.0% |

L: Rod for tensile test in accordance with DIN 53455, Test Specimen 3, smooth surfaces on all aides. Color light grayish brown, mainly of potato starch and wheat flour, density of material 1.31 g/cm³.

| Composition: | |
|---|---|
| Carbohydrates | 76.5% |
| including glycerol | 15.0% |
| Water | 13.0% |
| Protein less than | 3.5% |
| Fat less than | 1.0% |
| Other components | 6.0% |

M: Slightly tapered rectangular bowl, 50 mm high, length at top 140 mm, width at top 90 mm, length at bottom 105 mm, width at bottom 55 mm. Color white, mainly of potato starch, density of material 0.18 g/cm³.

| Composition: | |
|---|---|
| Carbohydrates | 85.5% |
| Water | 11.0% |
| Protein less than | 0.5% |
| Fat less than | 0.5% |
| Other components | 3.0% |

N: Cornetlike container, side length 80 mm, 100 mm in diameter, smooth inside surface, script on outside surface. In wafer color, mainly of wheat flour and potato starch, density of material 0.16 g/cm³.

| Composition: | |
|---|---|
| Carbohydrates | 77.0% |
| Water | 8.0% |
| Protein | 8.5% |
| Other components | 6.5% |

O: Cornetlike container, side length 50 mm, opening 56 mm in diameter, with directly adjoining cylindrical ring 8 mm high and with an opening having the same diameter Cream-colored, mainly of potato starch, density of material 1.35 g/cm³.

| Composition: | |
|---|---|
| Carbohydrates | 87.0% |
| including glycerol | 16.0% |
| Water | 7.0% |
| Protein less than | 1.0% |
| Fat less than | 0.5% |
| Other components | 4.5% |

P: Trays, 165 mm×65 mm×19 mm, with rounded corners Color white, mainly of potato starch and potato starch derivative, density of material 0.16.

| Composition: | |
|---|---|
| Carbohydrates | 87.0 |
| including modified starch | 8.5 |
| including cellulose | 2 |
| Water | 11.5 |
| Protein less than | 0.5 |
| Fat less than | 0.5 |
| Other components | 1.7 |

Q: Trays, 220 mm×220 mm×20 mm, with rounded corners Color white, mainly of potato starch and starch derivative, density of material 0.17.

| Composition: | |
|---|---|
| Carbohydrates | 86.0 |
| including modified starch | 34.5 |
| Water | 11.5 |
| Protein less than | 0.5 |
| Fat less than | 0.5 |
| Other components | 2.0 |

R: Tapered oblong bowl, 148 mm×90 mm×50 mm Cream-colored, mainly of cellulose, potato starch, and starch derivative, density of material 0.16.

| Composition: | |
|---|---|
| Carbohydrates | 82.5 |
| including modified starch | 4.0 |
| including cellulose | 41.5 |
| Water | 9.0 |
| Protein less than | 0.5 |
| Fat less than | 0.5 |
| Other components | 8.0 |

Coatings which are not formed in accordance with the invention and the testing thereof.

(a) Without a coating

The contact with water results immediately in a swelling and a softening of the surface; when the liquid which can be poured off has been removed a certain tackiness is detected (substrates D, J).

A thorough softening, which in most cases is accompanied by a permeation of liquid, takes place in substrate D after not more than 15 minutes.

Substrate J swells progressively; swollen particles detach from the surface.

(b) With use of commercially available, pre-formulated coating materials

1. Transparent shellac lacquer containing copal resin and larch resin balsam (Auro)
2. Transparent shellac lacquer comprising copal resin, dammar, silica, linseed oil fatty acid, balsam oil of turpentine (Auro)
3. White lacquer comprising natural resin oil and titanium oxide pigment
4. Fritzeloid 716 nitrocellulose lacquer (0. Fritze)
5. Acryl lacquer, Überzugslack 725 (0. Fritze)
6. PVC lacquer, Vernierlack 726 (0. Fritze)
7. Transparent shellac lacquer, Spritzlack 737 (0. Fritze)
8. Polyamide lacquer for sausage casings in isopropanol
9. Cegeskin R dip coating solution for raw sausages (Grünau)
10. IXAN WA 50 PVDC dispersion (Solvay)

It was not possible to form a durably waterproof coating in any of the cases (substrate D):

| Nos. 1., 2., 4., 5., 6., 7., 8. | Too brittle, cracking, softening |
|---|---|
| No. 3 | Separation from matrix, thick layer |
| No. 9 | Softening through |
| No. 10 | Cracked layer, which does not firmly adhere, deformation of substrate |

Application of coating solutions with organic solvents%

In the examples to be described hereinafter the lacquerlike coating was applied by known coating processes until the required coating weight had been achieved.

The application technology itself—by casting, brushing, spraying, centrifuging—has no primary significance.

Drying was effected at room temperature or by an accelerated drying in a warm air stream until the odor was neutral, preferably below 45° C., in any case about 10 degrees below the boiling point of the solvent component having the lowest boiling point.

Statements in parts by weight, with the esception of solvents, for which the equivalent volume at a density of 1 is stated (see Example 1).

EXAMPLE 1

Substrate A, with coating on inside surface:

| 0.4 g/dm$^2$ after drying | |
|---|---|
| Ethyl cellulose | 15 g |
| Rosin | 6 g |
| Ethanol | 25 ml |
| Ethyl acetate | 25 ml |
| Acetone | 25 ml |
| Plasticizer | 4 g |
| Results: | |
| Plasticizer | Testing time in days |
| Dioctyl phthalate | 24 |
| Tributyrin | 12 |
| Medium-chain-length triglycerides | 16 |
| Trioleate | 5 |

EXAMPLE 2

Substrate A, with coating on inside surface:

| 0.3 g/dm$^2$ after drying | |
|---|---|
| Ethylcellulose | 15 |
| Rosin | 6 |
| Ethanol | 25 |
| Ethyl acetate | 25 |
| Acetone | 25 |
| Plasticizer | 4 |
| Results: | |
| Plasticizer | Testing time in days |
| Butyl stearate | <1 |
| Oleic acid | 10 |

EXAMPLE 3

Substrate A with coating on inside surface:

| 0.6 g/dm$^2$ after drying | |
|---|---|
| Ethyl cellulose | 15 |
| Rosin | 6 |
| Ethanol | 25 |
| Ethyl acetate | 25 |
| Acetone | 25 |
| Plasticizer | 4 |
| Results: | |
| Plasticizer | Testing time in days |
| Epoxidized soybean oil | 57 |
| Polymergic acid | 12 |

EXAMPLE 4.1

Substrate B with coating on inside surface:

| 0.4 g/dm² after drying | |
|---|---|
| Ethyl cellulose | 15 |
| Rosin | 6 |
| Ethanol | 25 |
| Ethyl acetate | 25 |
| Acetone | 25 |
| Castor oil | 4 |
| Result: Testing time in days | >150 |

EXAMPLE 4.2

Substrate and coating as in 4.1. Filling with hot water (test stage 3)

| Result: Testing days in hours | >24 |
|---|---|

EXAMPLE 5

Substrate B with coating on inside surface:

| 0.25 g/dm² after drying | |
|---|---|
| Ethyl cellulose | 15 |
| Rosin | 6 |
| Ethanol | 25 |
| Ethyl acetate | 25 |
| Acetone | 25 |
| Oleic acid | 4 |
| Results: Testing time in days | >50 |

EXAMPLE 6

Other solvent-containing formulations:

| | | | % |
|---|---|---|---|
| 1.1 | Ethyl cellulose | | 11.5 |
| | Rosin, hydrogenated | | 4.5 |
| | Medium-chain-length triglycerides | | 4.0 |
| | Ethanol | | 80.0 |
| 1.2 | Ethyl cellulose | | 7.3 |
| | Rosin, hydrogenated | | 7.0 |
| | Medium-chain-length triglycerides | | 4.0 |
| | Ethanol | | 80.0 |
| 1.3 | Ethyl cellulose | | 13.0 |
| | Rosin, hydrogenated | | 4.5 |
| | Medium-chain-length triglycerides | | 4.0 |
| | Ethanol | | 80.0 |
| 1.4 | Ethyl cellulose | | 13.1 |
| | Rosin, hydrogenated | | 2.9 |
| | Medium-chain-length triglycerides | | 4.0 |
| | Ethanol | | 80.0 |
| 1.5 | Ethyl cellulose | | 12.0 |
| | Rosin, hydrogenated | | 4.5 |
| | Medium-chain-length triglycerides | | 3.5 |
| | Ethanol | | 64.0 |
| | Ethyl acetate | | 16.0 |
| 1.6 | Ethyl cellulose | | 12.0 |
| | Rosin, hydrogenated | | 4.5 |
| | Medium-chain-length triglycerides | | 3.5 |
| | Ethanol | | 40.0 |
| | Acetone | | 40.0 |
| 1.7 | T50 ethyl cellulose | | 10.0 |
| | Rosin, hydrogenated | | 5.0 |
| | Castor oil | | 3.0 |
| | Ethyl acetate | | 66.0 |
| | Ethanol | | 16.0 |
| 1.8 | N4 ethyl cellulose | | 14.5 |
| | Rosin, hydrogenated | | 6.25 |
| | Castor oil | | 4.0 |
| | Ethanol | | 60.0 |
| | Acetone | | 15.0 |
| 1.9 | T10 ethyl cellulose | | 14.25 |
| | Rosin, hydrogenated | | 7.25 |
| | Castor oil | | 3.50 |
| | Ethanol | | 60.0 |
| | Acetone | | 15.0 |
| 2.0 | T10 ethyl cellulose | | 15.0 |
| | Rosin, hydrogenated | | 6.25 |
| | Castor oil | | 3.75 |
| | Ethanol | | 60.0 |
| | Acetone | | 15.0 |
| 2.1 | N22 ethyl cellulose | | 14.5 |
| | Rosin, hydrogenated | | 6.75 |
| | Castor oil | | 3.75 |
| | Ethanol | | 60.0 |
| | Acetone | | 15.0 |
| 2.2 | 55-0.2 cellulose acetobutyrate | | 14.5 |
| | Rosin, hydrogenated | | 6.75 |
| | Castor oil | | 3.75 |
| | Ethanol | | 60.0 |
| | Acetone | | 15.0 |
| 2.3 | 553-0.4 cellulose acetobutyrate | | 14.5 |
| | Rosin, hydrogenated | | 6.75 |
| | Castor oil | | 3.75 |
| | Acetone | | 60.0 |
| | Ethanol | | 15.0 |
| 2.4 | Ethyl cellulose | | 15.0 |
| | Rosin, polymerized | | 6.0 |
| | Castor oil | | 4.0 |
| | Ethanol | | 37.5 |
| | Acetone | | 37.5 |
| 2.5 | Ethyl cellulose | | 12.0 |
| | Rosin, polymerized | | 5.0 |
| | Castor oil | | 3.0 |
| | Ethanol | | 40.0 |
| | Acetone | | 40.0 |
| 2.6 | Ethyl cellulose | | 11.4 |
| | Rosin, hydrogenated | | 5.8 |
| | Castor oil | | 2.8 |
| | Ethanol | | 40.0 |
| | Acetone | | 40.0 |
| 2.7 | Ethyl cellulose | | 11.6 |
| | Rosin, partly hydrogenated | | 5.4 |
| | Castor oil | | 3.0 |
| | Ethanol | | 40.0 |
| | Acetone | | 40.0 |
| 2.8 | T10 ethyl cellulose | | 12.0 |
| | Resin acids, dimerized | | 4.0 |
| | Castor oil | | 4.0 |
| | Ethanol | | 40.0 |
| | Acetone | | 40.0 |
| 2.9 | T10 ethyl cellulose | | 11.4 |
| | Gum sandarac | | 5.8 |
| | Castor oil | | 2.8 |
| | Ethyl acetate | | 16.0 |
| | Ethanol | | 64.0 |
| 3.0 | T10 ethyl cellulose | | 11.4 |
| | Mastic | | 5.8 |
| | Castor oil | | 2.8 |
| | Ethyl acetate | | 16.0 |
| | Ethanol | | 64.0 |
| 3.1 | T10 ethyl cellulose | | 11.6 |
| | Rosin, hydrogenated, esterified with pentaerythritol | | 5.4 |
| | Castor oil | | 3.0 |
| | Ethyl acetate | | 16.0 |
| | Ethanol | | 64.0 |
| 3.2 | T10 ethyl cellulose | | 11.6 |
| 5.4 | Methyl ester of hydrogenated rosin | | 5.4 |
| | Castor oil | | 3.0 |
| | Ethyl acetate | | 16.0 |
| | Ethanol | | 64.0 |
| 3.3 | T10 ethyl cellulose | | 11.6 |

-continued

|   |   | % |
|---|---|---|
|   | Glycerol ester of hydrogenated rosin | 5.4 |
|   | Castor oil | 3.0 |
|   | Ethyl acetate | 16.0 |
|   | Ethanol | 64.0 |
| 3.4 | Ethyl cellulose | 11.6 |
|   | Rosin glycerol ester | 5.4 |
|   | Castor oil | 3.0 |
|   | Ethyl acetate | 16.0 |
|   | Ethanol | 64.0 |
| 3.5 | Ethyl cellulose | 11.6 |
|   | Shellac | 4.8 |
|   | Castor oil | 3.6 |
|   | Ethanol | 80.0 |
| 3.6 | Ethyl cellulose | 14.0 |
|   | Copal resin | 7.0 |
|   | Castor oil | 4.0 |
|   | Ethanol | 50.0 |
|   | Acetone | 25.0 |
| 3.7 | Cellulose acetopropionate | 13.1 |
|   | Shellac | 2.6 |
|   | Triethyl citrate | 5.3 |
|   | Ethanol | 78.6 |
| 3.8 | Cellulose diacetate | 3.7 |
|   | Shellac | 2.2 |
|   | Triethyl citrate | 1.1 |
|   | Acetone | 56.0 |
|   | Ethanol | 37.0 |

In tests using substrates A and B the following results are obtained with the stated coatings having after drying a coating weight between 0.3 and 0.5 g/dm². Results corresponding to test stage 2, with the exception of coatings 3.2 and 3.5 (test stage 1).

EXAMPLE 7

| N7 ethyl cellulose | 15.0 |
|---|---|
| Rosin, hydrogenated | 6.0 |
| Ethanol | 50.0 |
| Acetone | 25.0 |
| Castor oil | 4.0 |

Coating weight 0.4 g/dm² after drying

| Designation of substrate | Test stage |
|---|---|
| B | 2, 3 |
| C | 2 |
| D | 2 |
| E | 2 |
| F | 2 |
| G | 2 |
| H | 1 |
| I | 1 |
| J | 2 |
| K | 2 |
| L | 2 |
| M | 2 |
| N | 1 |
| O | 2 |

EXAMPLE 8

Substrates B, 0 spray-coated on inside surface

| Ethyl cellulose | 15 |
|---|---|
| Ethanol | 30 |
| Methyl acetate | 25 |
| Acetone | 25 |
| Castor oil | 5 |

Drying in warm air stream (45 to 50° C.)

The water content of substrate O is decreased by up to 0.5% to about 6.8%. The water content of substrate B is decreased by 0.5% to about 9.3%.

Test stage 1

That example using a film-forming substance plus a plasticizer but no binder results in softer layers, which are less smooth and less scratch-resisting and have a Shorter permeation time.

EXAMPLE 9

Substrates B, 0 with cast coating on inside surface

| Rosin, hydrogenated | 32.3 |
|---|---|
| Ethanol | ad 100 |
| Acetone | 25 |
| Propanol-2 | 10 |
| Castor oil | 1 |

In substrate B this solution having a relatively low viscosity results in an inadequate bridging of pores, apparently because it flows and is sucked into the pores.

It is suggested by this experiment and similar experiments that, as a rule, the solution must have a certain base viscosity, particularly in excess of 300 mPas, for a sufficient bridging of pores, at least in substrate B.

For this reason, substrates which are more compact and/or are non-porous, such as substrate O, can be coated even without the use of a film-forming substance.

Substrate B test stage -
Substrate O test stage 1

The combination of a hydrophobic binder plus a plasticizer meets a minimum requirement for an inferior embodiment. Stable layers which are not brittle cannot be formed from solutions of the binder alone.

EXAMPLE 10

Coating cup (substrate B) on its inside surface by a centrifugal technology

Coating solution:

| Ethyl cellulose (1) | 13.5 g |
|---|---|
| Shellac (2) | 2.7 g |
| Triglycerides (3) | 3.8 g |
| Ethanol | 75.0 ml |
| Acetone | 5.0 ml |

(1) Type N7 (Hercules)
(2) Type 101 (MHP)
(3) Type Delios S (Grünau)

A homogeneous solution is prepared from the components (room temperature). The cup is fixed to a holder which can be rotated about its axis and is rotated at 900 revolutions per minute (r.p.m.).

Some milliliters are introduced close to the bottom of the rotating cup. After 25 seconds the speed is decreased to 300 r.p.m. and drying by a blown air stream at room temperature is effected for 45 seconds. That time amounts to 30 to 120 seconds depending on the boiling point of the solvent.

| Coating weight after drying and moisture equalization | |
|---|---|
| two applications | 0.35 g test stage 1 |
|   | 0.60 g test stage 2 |

EXAMPLE 11

Coating a cup (substrate E) on its inside surface by centrifugal technology

| Coating solution: | |
| --- | --- |
| Ethyl cellulose (1) | 15 |
| Rosin, hydrogenated (2) | 6 |
| Epoxide, soybean oil (3) | 4 |
| Ethanol | 50 |
| Acetone | 25 |

| Coating solution as in the preceding Example 10. | |
| --- | --- |
| Coating weight: | 0.5 g test stage 2 |
| two applications: | 0.85 g test stage 3 |

(1) Type N7 (Hercules)
(2) Type Foral AX (Hercules)
(3) Type Relifier 3 160 (Grindsted)

EXAMPLE 12

Spray-coating a cup (substrate E) on its inside surface

| Ethyl cellulose (1) | 10 |
| --- | --- |
| Shellac (2) | 3 |
| Castor oil | 3 |
| Ethanol | 84 |

(1) Type N7 (Hercules)
(2) Type 101 (MHP)

The cup is mounted on a holder which can rotate about its axis and is rotated at 200 r.p.m. A paint spray gun (3 mm nozzle, 1 bar) is used for about 3 seconds to spray on the inside surface and the rim of the cup at an angle of 45° to the bottom of the cup. The overspray is sucked off. This is followed by a blowing of air at room temperature for about 1 minute for drying.

Coating weight: 0.4 g test stage 1

EXAMPLE 13

Spray-coating cups (substrates G, J) on their top surface in a continuous process

| Coating solution: | |
| --- | --- |
| Ethyl cellulose (1) | 10 |
| Shellac (2) | 3 |
| Castor oil | 3 |
| Ethanol | 84 |

(1) Type N7 (Hercules)
(2) Type 101 (MHP)

The trays are fixed with thin metal clips to a rod system, which can be translated by a tension chain system and are thus moved thorough a spray booth. Spraying is effected by two mutually opposite nozzles, which are laterally offset, at an angle of inclination of 60°. A stackable condition which is dry to the touch is achieved at about 40° C. within not more than 2 minutes in the immediately succeeding exhaust air tunnel.

Coating weight:
Substrate G 0.7 g test stage 1
Substrate J 0.3 g test stage 1

EXAMPLE 14

Roll-coating of trays (substrate J) on their top surfaces.

| Coating solution: | Viscosity 375 mPas |
| --- | --- |
| Ethyl cellulose (1) | 10 |
| Shellac (2) | 4 |
| Plasticizer (3) | 4 |
| Ethanol | 80 |
| Acetone | 2 |

(1) Type EC-N22 (Hercules)
(2) Type 100 (MHP)
(3) Type Delios S (Grünau)

The application is manually effected by means of a foam-covered paint roller. Two applications with intermediate air blowing for 30 seconds.

Coating weight: 0.90 g test stage 1

EXAMPLE 15

1. Spray-coating of trays (substrates G, H, I, J, P, Q) on top surfaces

Coating solution: As in Example 6, formulation 3.7.

The trays are fixed with thin metal clips to a rod system, which can be translated by a tension chain system and are thus moved through a spray booth. Spraying is effected by two mutually opposite nozzles, which are laterally offset, at an angle of inclination of 60°. A stackable condition which is dry to the touch is achieved at about 40° C. within not more than 2 minutes in the immediately succeeding exhaust air tunnel.

Coating weight: 0.4 g/dm$^2$
Result: Test stage 1 passed

2. Spray-coating of rectangular bowls (substrates M, R)

The inside surfaces are sequentially spray-coated twice with an intermediate air blowing at 30° C. The coating is thicker on the bottom of the bowl than on its side edges.

Coating weight (determined by back-conditioning.): 0.65 g

Result: Test stage 1 passed.

We claim:

1. A process of applying a watertight coating to at least a portion of a surface of a shaped element produced by baking a starch-containing composition between two halves of a mold, the baked composition having a water content of 6% to 22%, by weight, and the surface containing adsorbed water of hydration, the process comprising the steps of
   (a) applying a layer of a lacquer to the surface portion to remove at least a portion of the water of hydration, the lacquer containing
      (1) at least one solvent selected from the group consisting of alcohols, ketones and esters, the solvent being miscible with water, boiling below a temperature of 100° C., and being toxicologically innocuous to human beings and to the ecology,
      (2) a hydrophobic and decomposable film-forming substance which is not soluble, dispersible and emulsifiable in water, and
      (3) a hydrophobic and decomposable plasticizer which is not soluble, dispersible and emulsifiable in water, and
   (b) removing the solvent from the lacquer layer until the lacquer layer is free of odor while maintaining a water content of at least 5%, by weight, in the shaped element while the solvent is removed.

2. The process of claim 1, wherein the film-forming substance contains at least one member selected from the group consisting of a hydrophobic alkyl cellulose, and a water-insoluble cellulose ester selected from the group consisting of a cellulose acetate butyrate, a cellulose acetate propionate and a cellulose acetate, except shellac.

3. The process of claim 1, wherein the plasticizer contains at least one member selected from the group consisting of a hydrophobic triglyceride of a medium- and long-chain fatty acid having a chain length of at least C4, a triglyceride with a short-chain partial substitution if at least one fatty acid has a chain length of at least C14, a phthalic acid ester, an acylic dicarboxylic acid ester, a fully esterified citric acid ester, saccharose acetate isobutyrate, and other hydrophobic sugar esters.

4. The process of claim 1, wherein the lacquer further contains at least one hydrophobic and decomposable binder selected from the group consisting of colophonium, copal, mastic, gum sandarac, a hydrated di- and polymerized colophonium-based resin, and an aliphatic hydrocarbon resin.

5. The process of claim 1, wherein the lacquer contains at least one solvent boiling below a temperature of 80° C.

6. The process of claim 1, wherein the weight ratio of the solvent content to the lacquer component content is between 1.5 and 17.

7. The process of claim 1, wherein the lacquer layer has a thickness of 15 to 150 µm.

8. The process of claim 7, wherein the lacquer layer has a thickness of at least 40 µm.

9. A process of applying a watertight coating to at least a portion of a surface of a shaped element produced by extruding a starch-containing composition, the extruded composition having a water content of 6% to 22%, by weight, and the surface containing adsorbed water of hydration, the process comprising the steps of (a) applying a layer of a lacquer to the surface portion to remove at least a portion of the water of hydration, the lacquer containing (1) at least one solvent selected from the group consisting of alcohols, ketones and esters, the solvent being miscible with water, boiling below a temperature of 100° C., and being toxicologically innocuous to human beings and to the ecology, (2) a hydrophobic and decomposable film-forming substance which is not soluble, dispersible and emulsifiable in water, and (3) a hydrophobic and decomposable plasticizer which is not soluble, dispersible and emulsifiable in water, and (b) removing the solvent from the lacquer layer until the lacquer layer is free of odor while maintaining a water content of at least 5%, by weight, in the shaped element while the solvent is removed.

10. The process of claim 9, wherein the film-forming substance contains at least one member selected from the group consisting of a hydrophobic alkyl cellulose, and a water-insoluble cellulose ester selected from the group consisting of a cellulose acetate butyrate, a cellulose acetate propionate and a cellulose acetate, except shellac.

11. The process of claim 9, wherein the plasticizer contains at least one member selected from the group consisting of a hydrophobic triglyceride of a medium- and long-chain fatty acid having a chain length of at least C4, a triglyceride with a short-chain partial substitution if at least one fatty acid has a chain length of at least C14, a phthalic acid ester, an acrylic dicarboxylic acid ester, a fully esterified citric acid ester, saccharose acetate isobutyrate, and other hydrophobic sugar esters.

12. The process of claim 9, wherein the lacquer further contains at least one hydrophobic and decomposable binder selected from the group consisting of colophonium, copal, mastic, gum sandarac, a hydrated di- and polymerized colophonium-based resin, and an aliphatic hydrocarbon resin.

13. The process of claim 9, wherein the lacquer contains at least one solvent boiling below a temperature of 80° C.

14. The process of claim 9, wherein the weight ratio of the solvent content to the lacquer component content is between 1.5 and 17.

15. The process of claim 9, wherein the lacquer layer has a thickness of 15 to 150 µm.

16. The process of claim 15, wherein the lacquer layer has a thickness of at least 40 µm.

\* \* \* \* \*